UNITED STATES PATENT OFFICE.

JOSEPH H. POTTS, OF PHILADELPHIA, PENNSYLVANIA.

SOLUTION FOR THE ELECTRO-DEPOSITION OF NICKEL.

SPECIFICATION forming part of Letters Patent No. 232,755, dated September 28, 1880.

Application filed May 10, 1880. (No specimens.)

*To all whom it may concern:*

Be it known that I, JOSEPH HUNT POTTS, a citizen of the United States, residing in Philadelphia, Pennsylvania, have invented an Improved Solution for the Electro-Deposition of Nickel, of which the following is a specification.

The object of my invention is to provide a solution for the electro-deposition of nickel which shall have the following advantages: that a hard, flexible, and tenacious electro deposit or plating of nickel of good metallic luster may be obtained from it more quickly than from the solutions now ordinarily used; that rolled-nickel anodes may be advantageously used in it; that it shall be more stable than the ordinary solutions, and better maintain proper metallic strength when a dynamo-electric machine is used in connection with it, and shall not require as great care and nicety in the regulation and adjustment of the electric current as are required in the use of ordinary solutions.

I have succeeded in producing a nickel-plating solution having the advantages of the presence of free acid and of great density, and yet free from the objections which have been heretofore made to acid solutions, and I compound the solution from acetate of nickel and acetate of lime, with the addition of an excess of acetic acid, so as to secure the constant presence in the solution of a quantity of free acetic acid, giving a strong acid reaction.

By practical tests I have found that an excellent hard, flexible, and tenacious electro-deposit of nickel can be secured, especially upon wares of cast-iron or brass, by the use of a solution compounded in the following proportions: To one United States gallon of solution one thousand five hundred and ninety grains of acetate of nickel containing in solution five hundred and thirty grains of metallic nickel; eight hundred and seventy-eight grains of acetate of lime containing in solution three hundred and eleven grains of caustic lime, and which may be made from five hundred and fifty-six grains of pure marble-dust dissolved in acetic acid; and in addition to these ingredients one fluid ounce of free acetic acid of 1.047 specific gravity, or its equivalent in acetic acid of other strength.

The said solution may be prepared in the following manner: Take two thousand five hundred and twenty-six grains of crystallized sulphate of nickel, dissolve it in water, heat to boiling. Then gradually add a solution of bicarbonate of soda until no more precipitation occurs. Filter out the precipitated carbonate of nickel and dissolve it in acetic acid, adding the acid gradually and agitating and warming until solution is effected. Take three hundred and eleven grains of caustic lime or five hundred and fifty-six grains of pure marble-dust, and dissolve in acetic acid in the same manner as directed for the solution of the carbonate of nickel. The solutions of nickel and lime are then to be put together and made up to the volume of one gallon by adding water. To this add one fluid ounce of acetic acid of specific gravity 1.047. The solution is then ready for use.

The bath may be kept acid by the addition from time to time of small portions of free acetic acid. I find, however, in practice, that the loss of acid is by no means rapid, and that the bath may be used and will maintain its acidity for a considerable period of time without fresh supplies.

I do not desire to confine myself to the precise proportions named, as somewhat different proportions may be used without materially changing the result, care being taken to have a quantity of free acetic acid in the solution.

The acetate of lime in my solution imparts to it density, and consequently increased electric conductivity, and also gives it greater stability than the ordinary solutions containing an ammonia salt, and to which it is frequently necessary to add ammonia. To the presence of the acetate of lime I also attribute the fact, which I have discovered in practice, that in the use of my solution no such care and nicety in the regulation of the electric current are necessary as in the use of the ordinary solutions.

Practical experience has shown me that with my solution an electric current more intense than any which is likely to be employed, even by accident, in actual practice may be used without any worse result than a slight black surface deposit, easily removed by a gentle rubbing, and the removal of which will disclose a good bright deposit of nickel underneath. This peculiarity of action renders it possible to "push" the solution in emergencies and still produce good work, and if the metallic strength of the solution should thus become too much diminished that difficulty may be readily and economically rectified by an increase of anode surface, a decrease of the intensity of the electric current, or by the two together.

Another advantage of my solution is the entire freedom of iron-work plated in it from liability to corrosion after removal from the cleansing-bath of warm water in which it is necessary to place it after leaving the plating-solution, thus obviating a very serious objection heretofore made to the presence of free acid in a nickel-plating solution—an objection, too, which has been found to exist in the use of ordinary solutions.

I am aware that a solution of acetate of nickel with an excess of acetic acid has been used for the electro-deposition of nickel, and such a solution I do not claim; but

I claim as my invention—

A solution for the electro-deposition of nickel, composed of acetate of nickel and acetate of lime, with an addition of free acetic acid, all substantially as herein set forth.

In testimony whereof I have signed my name to this specification in the presence of two subscribing witnesses.

JOSEPH HUNT POTTS.

Witnesses:
JAMES F. TOBIN,
HARRY SMITH.